US010382119B2

(12) United States Patent
Mizutani et al.

(10) Patent No.: US 10,382,119 B2
(45) Date of Patent: Aug. 13, 2019

(54) DATA COMMUNICATION SYSTEM, DATA COMMUNICATION METHOD, AND NON-TRANSITORY STORAGE MEDIUM

(71) Applicant: SUBARU CORPORATION, Tokyo (JP)

(72) Inventors: Takuma Mizutani, Tokyo (JP); Yasuhiko Yanase, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 13 days.

(21) Appl. No.: 15/840,839

(22) Filed: Dec. 13, 2017

(65) Prior Publication Data
US 2018/0241462 A1    Aug. 23, 2018

(30) Foreign Application Priority Data

Feb. 22, 2017    (JP) ................................ 2017-030796

(51) Int. Cl.
H04B 7/185    (2006.01)
(52) U.S. Cl.
CPC ..... *H04B 7/18506* (2013.01); *H04B 7/18504* (2013.01)
(58) Field of Classification Search
CPC .......................... H04B 7/18506; H04B 7/024; H04B 7/18504; G01S 7/282; G01S 7/285;
(Continued)

(56) References Cited

U.S. PATENT DOCUMENTS

2004/0021599 A1\* 2/2004 Hall ........................ G01S 7/282
342/28
2006/0221891 A1    10/2006 Schmitz et al.
(Continued)

FOREIGN PATENT DOCUMENTS

EP    1926234 A2    5/2008
JP    2004-336408 A    11/2004
(Continued)

OTHER PUBLICATIONS

Japanese Decision to Grant a Patent issued in corresponding Japanese Patent Application No. 2017-030796, dated Nov. 6, 2018, with English Translation.
(Continued)

*Primary Examiner* — Jianxun Yang
(74) *Attorney, Agent, or Firm* — McDermott Will & Emery LLP

(57)    ABSTRACT

A data communication system includes an information acquiring unit and a selector. The information acquiring unit acquires positional information of a third party capable of detecting data communication performed between communication bodies, positional information of each of the communication bodies, and terrain information. The selector selects a fourth communication body from third communication bodies when transmission of transmission data from a first communication body to a second communication body out of the communication bodies is not successful. The third communication bodies are remaining communication bodies out of the communication bodies excluding the first and the second communication bodies and successful in receiving the transmission data from the first communication body. The fourth communication body is lowest in a possibility that the data communication is detected by the third party out of the third communication bodies, and transmits the transmission data to the second communication body.

15 Claims, 3 Drawing Sheets

(58) Field of Classification Search
CPC ...... G01S 7/292; G01S 13/003; H04W 24/02; H04W 4/008; H04W 4/025; H04W 4/021; H04W 4/80; H04W 4/02; H04W 56/0015; H04W 84/18; B64C 39/024; G05D 1/0088; G06Q 10/087
See application file for complete search history.

(56) References Cited

U.S. PATENT DOCUMENTS

| | | | |
|---|---|---|---|
| 2015/0085853 A1* | 3/2015 | Smith | H04W 56/0015 370/350 |
| 2016/0142868 A1* | 5/2016 | Kulkarni | H01Q 1/24 455/456.5 |
| 2016/0285541 A1 | 9/2016 | Liu | |
| 2017/0188238 A1 | 6/2017 | Nagamatsu | |
| 2017/0235316 A1* | 8/2017 | Shattil | B64C 39/024 701/3 |

FOREIGN PATENT DOCUMENTS

| | | |
|---|---|---|
| JP | 2006-279950 A | 10/2006 |
| JP | 2010-239454 A | 10/2010 |
| JP | 2015-177216 A | 10/2015 |
| WO | 2015/198660 A1 | 12/2015 |

OTHER PUBLICATIONS

European Search Report issued in corresponding European Patent Application No. 18150751, dated Jun. 28, 2018.

* cited by examiner

DATA COMMUNICATION SYSTEM, DATA COMMUNICATION METHOD, AND NON-TRANSITORY STORAGE MEDIUM

CROSS-REFERENCE TO RELATED APPLICATIONS

The present application claims priority from Japanese Patent Application No. 2017-030796 filed on Feb. 22, 2017, the entire contents of which are hereby incorporated by reference.

BACKGROUND

The technology relates a technique that performs data communication between a plurality of communication bodies. In particular, the technology relates to a technique useful in performing data communication safely by reducing a possibility of detection by a third party.

There are situations where data is not receivable directly from a transmission-source communication body upon performing data communication between a plurality of communication bodies. For example, the data is not receivable directly when transmission of the data is interrupted by terrain.

To address such situations, a technique has been proposed in which a communication body other than the transmission-source communication body relays, to a transmission-destination communication body, the data received from the transmission-source communication body. For example, reference is made to Japanese Unexamined Patent Application Publication (JP-A) No. 2004-336408.

SUMMARY

A technique disclosed in JP-A No. 2004-336408 simply relays data by means of a communication body other than a transmission-source communication body. Hence, there is a concern that data communication performed in the technique disclosed in JP-A No. 2004-336408 is detected easily by a third party.

It is desirable to provide a data communication system, a data communication method, and a non-transitory storage medium that are able to reduce a possibility of detection by a third party and thereby to perform data communication between a plurality of communication bodies more safely.

An aspect of the technology provides a data communication system configured to include a plurality of communication bodies and perform data communication between the plurality of communication bodies. The data communication system includes: an information acquiring unit configured to acquire positional information of a third party, positional information of each of the communication bodies, and terrain information, in which the third party is capable of detecting the data communication performed between the plurality of communication bodies, and in which the terrain information is information on terrain on periphery of the plurality of communication bodies; and a selector configured to select a fourth communication body from third communication bodies when transmission of transmission data from a first communication body to a second communication body out of the plurality of communication bodies is not successful. The third communication bodies are remaining communication bodies out of the plurality of communication bodies excluding the first communication body and the second communication body and are successful in receiving the transmission data from the first communication body. The fourth communication body is lowest in a possibility that the data communication is detected by the third party out of the third communication bodies on a basis of the positional information of each of the third communication bodies, the terrain information, and the positional information of the third party, and transmits the transmission data to the second communication body.

An aspect of the technology provides a data communication method that performs, in a data communication system that includes a plurality of communication bodies, data communication between the plurality of communication bodies. The data communication method includes: acquiring positional information of a third party, positional information of each of the communication bodies, and terrain information, in which the third party is capable of detecting the data communication performed between the plurality of communication bodies, and in which the terrain information is information on terrain on periphery of the plurality of communication bodies; selecting a fourth communication body from third communication bodies when transmission of transmission data from a first communication body to a second communication body out of the plurality of communication bodies is not successful, in which the third communication bodies are remaining communication bodies out of the plurality of communication bodies excluding the first communication body and the second communication body and are successful in receiving the transmission data from the first communication body, and in which the fourth communication body is lowest in a possibility that the data communication is detected by the third party out of the third communication bodies on a basis of the positional information of each of the third communication bodies, the terrain information, and the positional information of the third party; and causing the fourth communication body to transmit the transmission data to the second communication body.

An aspect of the technology provides a non-transitory computer readable storage medium having a data communication program. The data communication program causes, when executed by a computer, the computer to implement a method that performs, in a data communication system that includes a plurality of communication bodies, data communication between the plurality of communication bodies. The method includes: acquiring positional information of a third party, positional information of each of the communication bodies, and terrain information, in which the third party is capable of detecting the data communication performed between the plurality of communication bodies, and in which the terrain information is information on terrain on periphery of the plurality of communication bodies; selecting a fourth communication body from third communication bodies when transmission of transmission data from a first communication body to a second communication body out of the plurality of communication bodies is not successful, in which the third communication bodies are remaining communication bodies out of the plurality of communication bodies excluding the first communication body and the second communication body and are successful in receiving the transmission data from the first communication body, and in which the fourth communication body is lowest in a possibility that the data communication is detected by the third party out of the third communication bodies on a basis of the positional information of each of the third communication bodies, the terrain information, and the positional information of the third party; and causing the fourth communication body to transmit the transmission data to the second communication body.

An aspect of the technology provides a data communication system that includes a plurality of communication bodies. The plurality of communication bodies each include circuitry configured to perform data communication between the plurality of communication bodies, acquire positional information of a third party, positional information of each of the communication bodies, and terrain information, in which the third party is capable of detecting the data communication performed between the plurality of communication bodies, and in which the terrain information is information on terrain on periphery of the plurality of communication bodies, select a fourth communication body from third communication bodies when transmission of transmission data from a first communication body to a second communication body out of the plurality of communication bodies is not successful, in which the third communication bodies are remaining communication bodies out of the plurality of communication bodies excluding the first communication body and the second communication body and are successful in receiving the transmission data from the first communication body, and in which the fourth communication body is lowest in a possibility that the data communication is detected by the third party out of the third communication bodies on a basis of the positional information of each of the third communication bodies, the terrain information, and the positional information of the third party, and cause the fourth communication body to transmit the transmission data to the second communication body.

DETAILED DESCRIPTION

Figure 1:
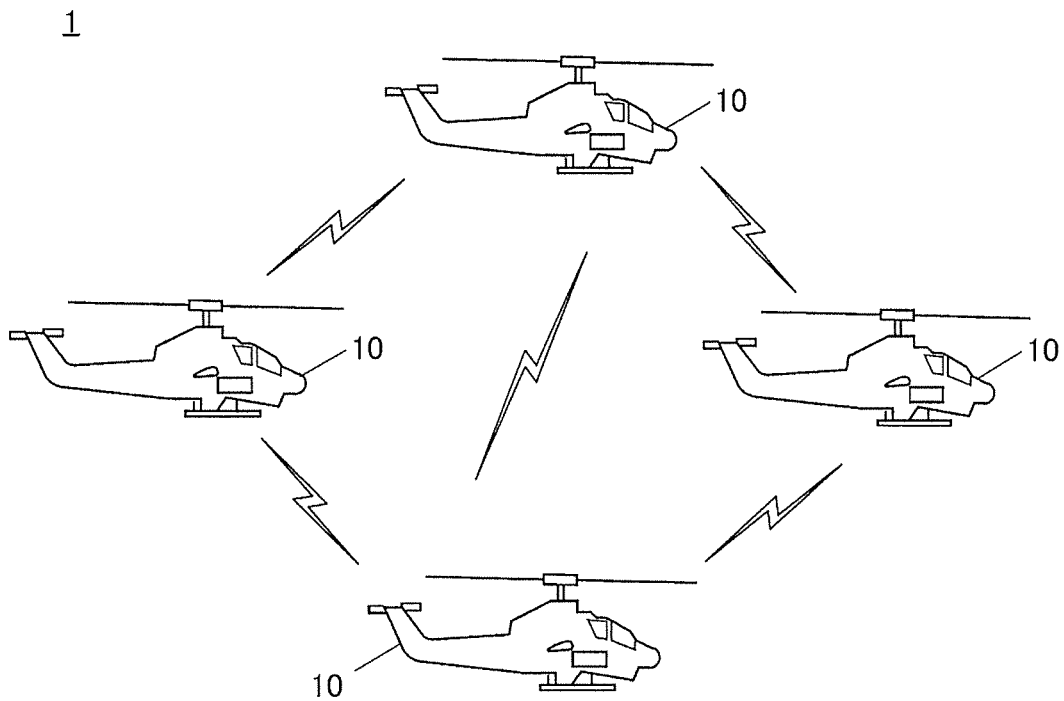
FIG. 1 is a conceptual diagram illustrating a data communication system according to one implementation of the technology.

In the following, a description is given of one implementation of the technology with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

[Configuration]

Figure 2:
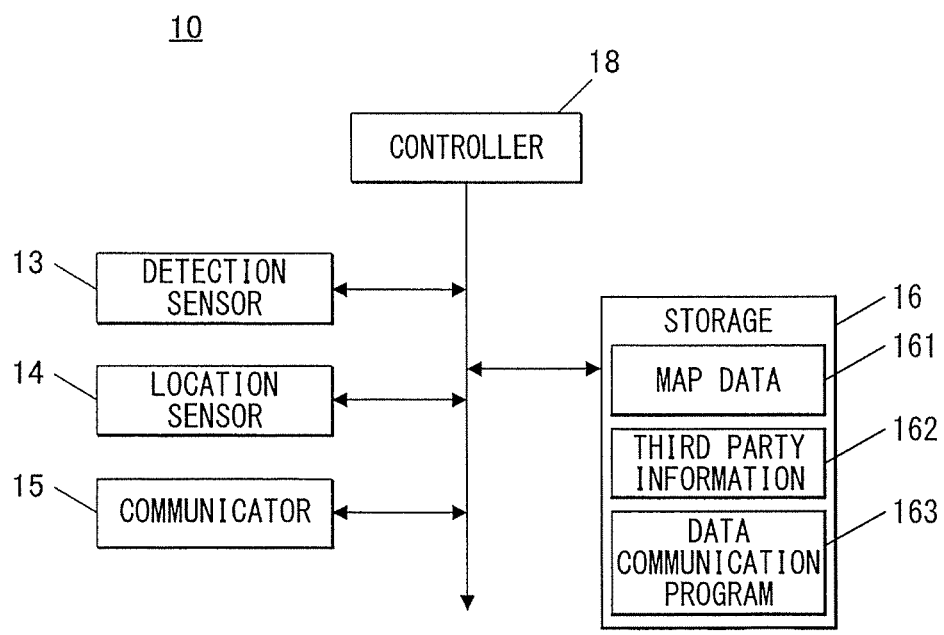
FIG. 2 is a block diagram illustrating a configuration of functions of an aircraft according to one implementation of the technology.

First, a description is given, with reference to FIGS. 1 and 2, of a configuration of a data communication system 1 according to one implementation of the technology. Note that a data communication method and a non-transitory storage medium having a data communication program according to one implementation of the technology are each embodied by some implementations described herein and are described together accordingly.

FIG. 1 is a conceptual diagram illustrating the data communication system 1. FIG. 2 is a block diagram illustrating a configuration of functions of an aircraft 10. The aircraft 10 may be a non-limiting example of a communication body that configures the data communication system 1.

Referring to FIG. 1, the data communication system 1 according to an example implementation includes the plurality of aircrafts 10, and is so configured as to allow data communication to be performed between the aircrafts 10 mutually. In an example implementation, the aircrafts 10 may be four helicopters, although the kinds of aircrafts 10 and the number of aircrafts 10 are not limited thereto. The data communication system 1 allows the data communication to be performed while reducing a possibility of detection, by a third party T illustrated in FIGS. 4A and 4B, of the data communication. In other words, the data communication system 1 is able to reduce the detection by the third party T of the data communication performed by any of the aircrafts 10 as a data transmission source.

Referring to FIG. 2, the aircrafts 10 each may include an unillustrated flight mechanism, a detection sensor 13, a location sensor 14, a communicator 15, a storage 16, and a controller 18. The flight mechanism allows corresponding one of the aircrafts 10 to fly.

The detection sensor 13 may detect factors including the third party T and other aircrafts 10 other than the own aircraft 10, and acquire positional information of each of the factors. The detection sensor 13 may be radar or any other detector that allows for the detection and the acquisition of the positional information. The detection sensor 13 may acquire the positional information of other aircrafts 10 and the third party T on the basis of a control command outputted from the controller 18, and output the acquired positional information to the controller 18.

The location sensor 14 may acquire positional information of the own aircraft 10. In an example implementation, the location sensor 14 may acquire coordinate information. The location sensor 14 may be a global positioning system (GPS) receiver, an inertial navigation device, or any other sensor that allows for the acquisition of the positional information, e.g., the coordinate information, of the own aircraft 10. The location sensor 14 may acquire the positional information of the own aircraft 10 on the basis of a control command outputted from the controller 18, and output the acquired positional information to the controller 18.

The communicator 15 may perform communication between the communicator 15 of the own aircraft 10 and the communicator 15 of another aircraft 10 by means of wireless communication, and transmit and receive various pieces of data therebetween in a mutual fashion.

The storage 16 may be a memory that stores a program, data, etc. that are used to achieve various functions of the aircraft 10, and serves as a workspace of the controller 18. In an example implementation, the storage 16 may contain map data 161 and third party information 162. The storage 16 also contains a data communication program 163 that causes the controller 18 to implement a method that performs the data communication between the aircrafts 10.

The map data 161 may include comprehensive geographic information including terrain information and information on a utilization state of the land. Non-limiting examples of the terrain information may include information on a mountain and a river. Non-limiting examples of the information on the utilization state of the land may include information on a road, a railway, a building, a farmland, and critical terrain.

The third party information 162 may relate to the third party T that can detect the data communication performed between the plurality of aircrafts 10. The third party information 162 may include, without limitation, data on a detection range of the third party T. In other words, the third party information 162 may include data on a range in which the third party T detects communication.

The controller 18 may perform a central control of each part of the aircraft 10. Specifically, the controller 18 may control the flight of the aircraft 10 and control an operation of the detection sensor 13. Further, the controller 18 may load a program such as the data communication program 163 stored in the storage 16, and thereby execute various processes on the basis of the loaded program.

[Operation]

A description is given next of an operation of the data communication system 1 upon performing the data communication between the four aircrafts 10 according to one implementation of the technology.

Figure 3:
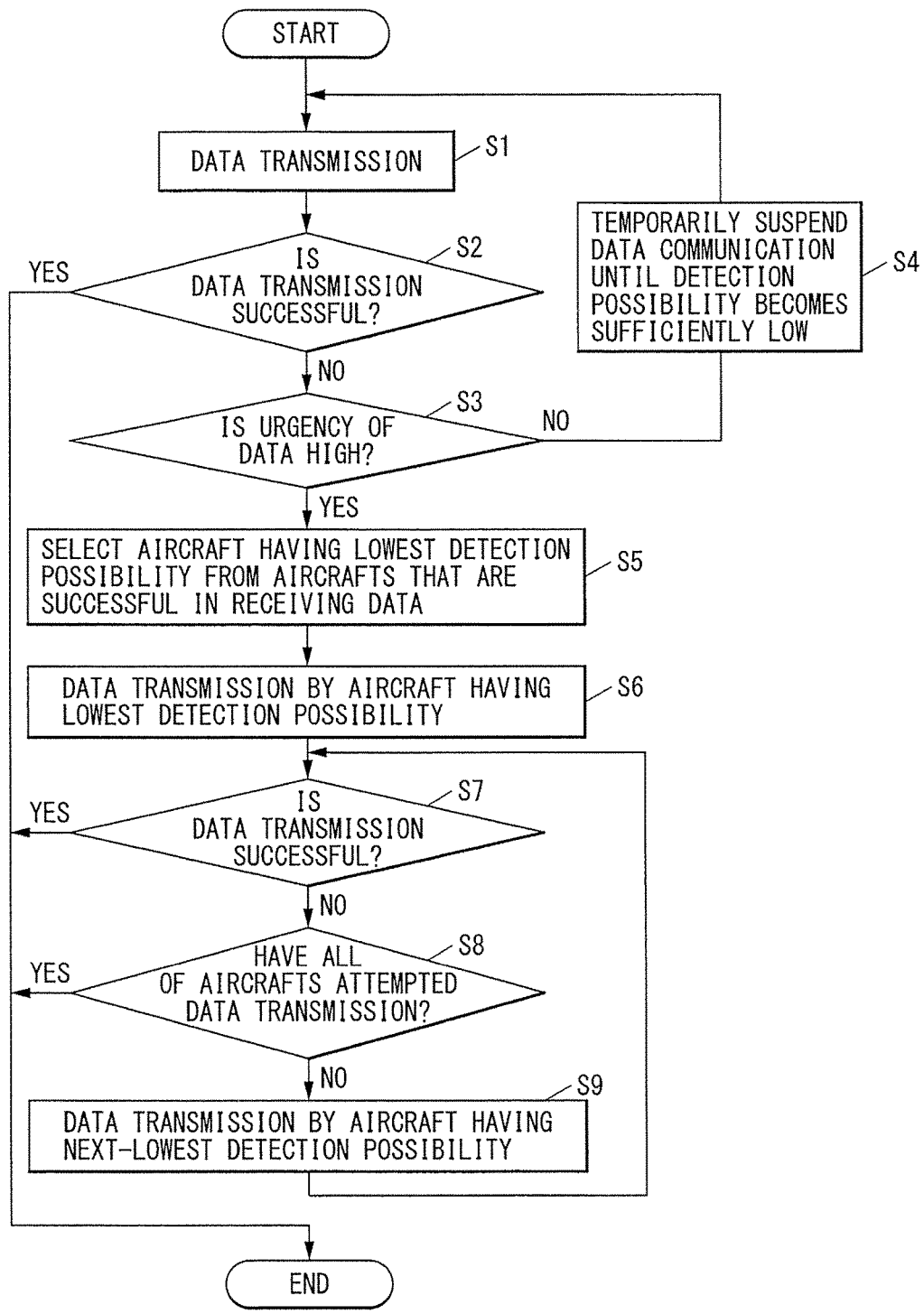
FIG. 3 is a flowchart illustrating a flow of operation performed in the data communication system according to one implementation of the technology.
Figure 4A:
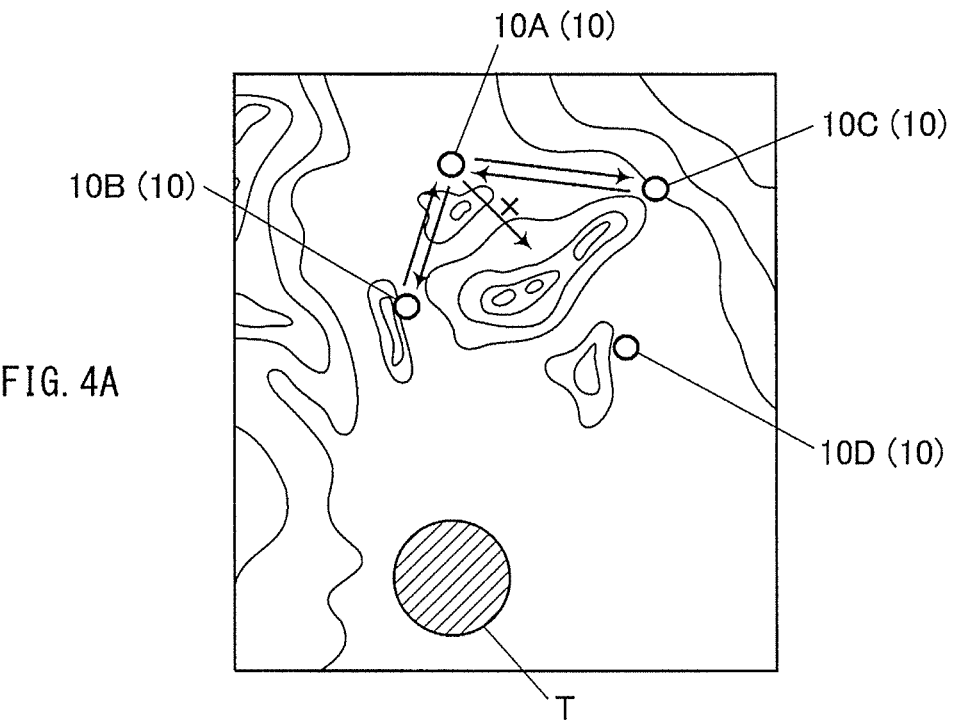
FIGS. 4A and 4B each describe an operation performed in the data communication system according to one implementation of the technology.
Figure 4B:
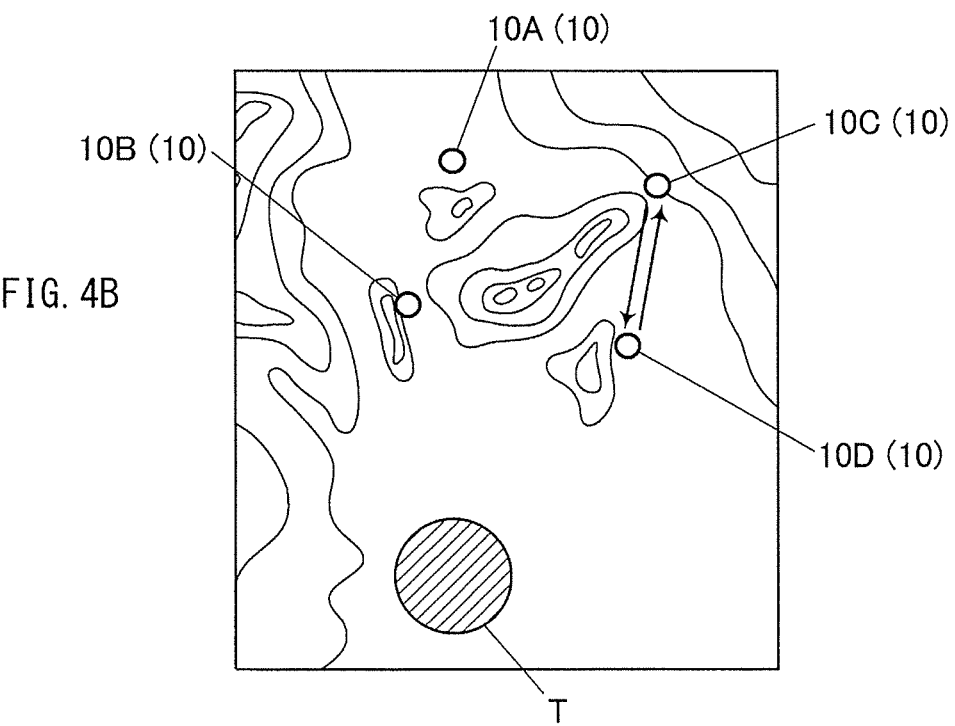

FIG. 3 is a flowchart illustrating a flow of operation performed in the data communication system 1. FIGS. 4A and 4B each describe the operation performed in the data communication system 1.

In the following, the description is given by referring to an example in which the four aircrafts 10 including aircrafts 10A to 10D deploy on the periphery of the detection range of the third party T as illustrated in FIGS. 4A and 4B. In the illustrated example, the aircrafts 10A has transmitted predetermined transmission data to other aircrafts 10B to 10D, and only the aircraft 10D among them has failed to receive the transmission data due to interruption by terrain or any other interrupting factor.

It is to be noted that each of the aircrafts 10, able to perform the data communication mutually, is able to know a status of communication of other aircrafts 10 other than the own aircraft 10 by the data communication performed.

Referring to FIG. 3, the aircraft 10A may transmit the transmission data to other aircrafts 10B to 10D by the communicator 15 (step S1). Thereafter, the controller 18 of the aircraft 10A may determine whether the transmission data has been successfully transmitted to all of other aircrafts 10B to 10D (step S2).

In an example implementation, the controller 18 of the aircraft 10A may confirm success and failure of the transmission of the transmission data on the basis of reception of an ACK signal from the corresponding transmission-destination aircraft 10. The ACK signal is a signal by which the receiving side notifies the transmitting side of normal completion of the data transmission.

In step S2, when a determination is made that the transmission data has been successfully transmitted to all of other aircrafts 10B to 10D (step S2: YES), the controllers 18 of the respective aircrafts 10A to 10D may end the data communication.

In step S2, when a determination is made that there is the aircraft 10 to which the transmission of the transmission data is not successful, i.e., when there is the aircraft 10 that does not provide the ACK signal in return (step S2: NO), the controller 18 of the transmission-source aircraft 10A and the controllers 18 of the respective aircrafts 10B and 10C that are successful in receiving the transmission data each determine whether urgency of the transmission data is high (step S3).

In an example implementation, the urgency of the transmission data may be set in advance by default to the transmission data in accordance with a kind of the relevant transmission data, and the transmission source (i.e., the aircraft 10A in an example implementation) may be able to select a level, in terms of high and low, of the urgency. In step S3, a determination may be made as to whether the urgency of the transmission data is higher than a preset determination level.

It is to be noted that the controllers 18 of the respective aircrafts 10B and 10C each know, by the data communication performed with respect to the transmission-source aircraft 10A, that the data communication between the aircraft 10A and the aircraft 10D is interrupted.

In step S3, when a determination is made that the urgency of the transmission data is not high (step S3: NO), the controllers 18 of the respective aircrafts 10A to 10C each may suspend the data communication until a possibility of detection, by the third party T, of the data communication becomes sufficiently low (step S4). A description on setting or calculation of the possibility of detection by the third party T, referred to as a "detection possibility" hereinafter, is given later in greater detail.

After the detection possibility becomes sufficiently low owing to a separation in distance from the third party T, or any other factor that makes the detection possibility sufficiently low, the controller 18 of the aircraft 10A may cause the process to make a transition to the foregoing step S1 to thereby resume the data communication.

In step S3, when a determination is made that the urgency of the transmission data is high (step S3: YES), the controllers 18 of the respective aircrafts 10B and IOC that are successful in receiving the transmission data from the aircraft 10A may select one of those aircrafts 10B and 10C which is the lowest in the detection possibility (step S5).

In step S5, the controllers 18 of the respective aircrafts 10B and 10C may determine the distance from the third party T and a degree of interruption with respect to the third party T on the basis of the mutual pieces of positional information of the respective aircrafts 10B and 10C, the terrain information, and the positional information of the third party T. By using the thus-determined distance from the third party T and the thus-determined degree of interruption as parameters, the controllers 18 of the respective aircrafts 10B and 10C may obtain the detection possibilities of the respective aircrafts 10B and 10C. In an example implementation, the detection possibility may be so set or calculated as to be lower as the distance from the third party T becomes larger and with an increase in the degree of interruption with respect to the third party T in term of the terrain. In other words, the detection possibility may be so set or calculated as to be lower as visibility from the third party T becomes less. The mutual pieces of positional information of the respective aircrafts 10B and 10C may be acquired by the detection sensors 13, the location sensors 14, and the communicators 15 of those respective aircrafts 10B and 10C. In addition, in each of the aircrafts 10B and 10C, the terrain information may be acquired from the map data 161 and the positional information of the third party T may be acquired by the third party information 162, the detection sensor 13, and the communicator 15.

Further, the controllers 18 of the respective aircrafts 10B and 10C may determine which of those aircrafts 10B and 10C is lower in the detection possibility.

In other words, in step S5, the controllers 18 of the respective aircrafts 10B and 10C that are successful in receiving the transmission data from the aircraft 10A may obtain, by themselves, the detection possibilities of the mutual aircrafts 10B and 10C by utilizing the distance from the third party T and the degree of interruption with respect to the third party T as the parameters. By obtaining the detection possibilities, the controllers 18 of the respective aircrafts 10B and 10C may determine, by themselves, whether the detection possibility of the own aircraft 10 is lower than the detection possibility of the other aircraft 10.

In an example implementation illustrated in FIGS. 4A and 4B, the aircraft 10C is lower in the detection possibility than the aircraft 10B.

Thereafter, the controller 18 of the aircraft 10C that is the lowest in the detection possibility between the aircrafts 10B and 10C may transmit the transmission data, received from the aircraft 10A, to the aircraft 10D as illustrated in FIG. 4B (step S6).

Thereafter, the controller 18 of the aircraft 10C that has transmitted the transmission data may determine whether the transmission data has been successfully transmitted to the aircraft 10D (step S7). The controller 18 of the aircraft 10C may make the determination on the basis of the presence or absence of the ACK signal provided from the aircraft 10D in return.

When a determination is made that the transmission data has been successfully transmitted to the aircraft 10D (step S7: YES), the controllers 18 of the respective aircrafts 10A to 10D may end the data communication.

In step S7, when a determination is made that the transmission of the transmission data to the aircraft 10D is not successful (step S7: NO), the controllers 18 of the respective aircrafts 10B and 10C may determine whether all of the aircrafts 10 that are successful in receiving the transmission data from the aircraft 10A, i.e., the aircrafts 10B and 10C, have attempted the data transmission to the aircraft 10D (step S8).

When a determination is made that there is the aircraft 10 that has not attempted the data transmission to the aircraft 10D (step S8: NO), the process may thereafter proceed to step S9. In step S9, the controller 18 of any aircraft 10 having the low detection possibility second to the detection possibility of the aircraft 10 that has attempted the data transmission most previously may transmit the transmission data to the aircraft 10D (step S9).

In an example implementation, when the aircraft 10C is not successful in transmitting the transmission data to the aircraft 10D, the controller 18 of the aircraft 10B having the low detection possibility second to the detection possibility of the aircraft 10C may transmit the transmission data to the aircraft 10D.

Thereafter, the controller 18 of the aircraft 10B may cause the process to make a transition to the foregoing step S7 to thereby determine whether the transmission data has been successfully transmitted to the aircraft 10D.

In step S8, when a determination is made that all of the aircrafts 10 that are successful in receiving the transmission data from the aircraft 10A, i.e., the aircrafts 10B and 10C, have attempted the data transmission to the aircraft 10D (step S8: YES), the controllers 18 of the respective aircrafts 10A to 10C may abandon the data transmission to the aircraft 10D and thus end the data communication.

[Example Effects]

According to an example implementation, the aircraft 10C is selected when the transmission of the transmission data from the aircraft 10A to the aircraft 10D is not successful. The aircraft 10C is the lowest in the detection possibility between the aircraft 10B and the aircraft 10C on the basis of the positional information of each of the aircrafts 10B and 10C that are successful in receiving the transmission data from the aircraft 10A, the terrain information on the terrain in the peripheral, and the positional information of the third party T. The aircraft 10C that is the lowest in the detection possibility transmits the transmission data to the aircraft 10D in place of the aircraft 10A, In other words, when the transmission of the transmission data from the aircraft 10A to the aircraft 10D is not successful, the transmission data is relayed by the aircraft 10C that is the lowest in the possibility that the data communication is detected by the third party T between the aircrafts 10B and 10C that are successful in receiving the transmission data from the aircraft 10A.

Thus, even when the third party T that is capable of detecting the data communication is present in the peripheral, it is possible to reduce the possibility of the detection by the third party T and thereby to perform the data communication between the plurality of aircrafts 10 more safely.

Hence, for example, it is possible to share information more safely between the plurality of aircrafts 10 even when the plurality of aircrafts 10 fly at a low altitude along the terrain.

[Modification Examples]

Although some implementations of the technology have been described above with reference to the accompanying drawings, the technology is by no means limited to the foregoing implementations. The implementations may be variously modified on an as-needed basis insofar as they are within the scope of the appended claims or the equivalents thereof.

For example, in an example implementation described above, each of the aircrafts 10B and 10C that has received the transmission data from the aircraft 10A acquires the mutual pieces of positional information of the respective aircrafts 10B and 10C, the terrain information, and the positional information of the third party T to thereby determine, on the basis of those pieces of information, whether the detection possibility of the own aircraft 10 is lower than the detection possibility of the other aircraft 10. In an alternative implementation, any representative aircraft, such as the transmission-source aircraft 10A, may obtain the detection possibility of each of the aircrafts 10B and 10C to thereby transmit the transmission data to the aircraft 10C having the lowest detection possibility.

Further, the data communication system, the data communication method, and the non-transitory storage medium according to an example implementation described above allow for performing of the data communication between the plurality of aircrafts 10. However, the data communication system, the data communication method, and the non-transitory storage medium according to any implementation of the technology are each applicable suitably to those that perform the data communication by communication bodies that are other than the aircrafts, such as a vessel.

The controller 18 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 18. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 18 illustrated in FIG. 2.

The invention claimed is:

1. A data communication system configured to include a plurality of mobile communication bodies and perform data communication between or among the plurality of mobile communication bodies, each of the mobile communication bodies of the data communication system comprising:
    an information acquiring unit configured to acquire positional information of a third party, positional information of each of the mobile communication bodies, and terrain information, the third party being capable of detecting the data communication performed between the plurality of mobile communication bodies, the terrain information being information on terrain on a periphery of a current location of the plurality of mobile communication bodies; and
    a selector;
    wherein when a transmission of transmission data from a first one of the mobile communication bodies to a second one of the mobile communication bodies is not successful and a transmission of the transmission data from the first one of the mobile communication bodies to third and fourth ones of the mobile communication bodies is successful, the selectors of third and fourth ones of the mobile communication bodies are configured to select the fourth one of the mobile communication bodies based on a determination that the fourth one of the mobile communication bodies is lowest between the third and fourth ones of the mobile communication bodies in a possibility that the data communication is detected by the third party, on a basis of the positional information of each of the third and fourth ones of the mobile communication bodies, the terrain information, and the positional information of the third party, and
    wherein, upon selection, a communicator of the fourth one of the mobile communication bodies is configured to transmit the transmission data to the second one of the mobile communication bodies.

2. The data communication system according to claim 1, wherein
    the selector of the third one of the mobile communication bodies is configured to determine whether the third one of the mobile communication bodies is the one to be selected to transmit the transmission data to the second one of the mobile communication bodies, and
    the selector of the fourth one of the mobile communication bodies is configured to determine whether the fourth one of the mobile communication bodies is the one to be selected to transmit the transmission data to the second one of the mobile communication bodies.

3. The data communication system according to claim 2, wherein, when the fourth one of the communication bodies is not successful in transmitting the transmission data to the second one of the communication bodies, the third one of the mobile communication bodies or a fifth one of the communication bodies is configured to transmit the transmission data to the second communication body, based on whether the third one of the mobile communication bodies or the fifth one of the communication bodies has a next lowest possibility to the possibility of the fourth one of the communication bodies.

4. The data communication system according to claim 3, wherein:
    the transmission data contains setting of urgency, and
    the selectors of the third and fourth ones of the mobile communication bodies are configured to select the fourth one of the communication bodies on a condition that the transmission of the transmission data from the first one of the communication bodies to the second one of the communication bodies is not successful and the urgency of the transmission data is higher than a predetermined determination level.

5. The data communication system according to claim 2, wherein:
    the transmission data contains setting of urgency, and
    the selectors of the third and fourth ones of the mobile communication bodies are configured to select the fourth one of the communication bodies on a condition that the transmission of the transmission data from the first one of the communication bodies to the second one of the communication bodies is not successful and the urgency of the transmission data is higher than a predetermined determination level.

6. The data communication system according to claim 1, wherein, when the fourth one of the communication bodies is not successful in transmitting the transmission data to the second one of the communication bodies, the third one of the mobile communication bodies or a fifth one of the communication bodies is configured to transmit the transmission data to the second communication body, based on whether the third one of the mobile communication bodies or the fifth one of the communication bodies has a next lowest possibility to the possibility of the fourth one of the communication bodies.

7. The data communication system according to claim 6, wherein:
    the transmission data contains setting of urgency, and
    the selectors of the third and fourth ones of the mobile communication bodies are configured to select the fourth one of the communication bodies on a condition that the transmission of the transmission data from the first one of the communication bodies to the second one of the communication bodies is not successful and the urgency of the transmission data is higher than a predetermined determination level.

8. The data communication system according to claim 1, wherein:
    the transmission data contains setting of urgency, and
    the selectors of the third and fourth ones of the mobile communication bodies are configured to select the fourth one of the communication bodies on a condition that the transmission of the transmission data from the first one of the communication bodies to the second one of the communication bodies is not successful and the urgency of the transmission data is higher than a predetermined determination level.

9. The data communication system of claim 1, wherein each of the mobile communication bodies comprises an aircraft.

10. A data communication method that performs, in a data communication system that includes a plurality of mobile communication bodies, data communication between the plurality of mobile communication bodies, the data communication method comprising:
 acquiring, with each of the mobile communication bodies, positional information of a third party, positional information of each of the communication bodies, and terrain information, the third party being capable of detecting the data communication performed between the plurality of communication bodies, the terrain information being information on terrain on periphery of a current location of the plurality of mobile communication bodies;
 selecting, when a transmission of transmission data from a first one of the communication bodies to a second one of the communication bodies is not successful and a transmission of the transmission data from the first one of the mobile communication bodies to third and fourth ones of the mobile communication bodies is successful, by the third and fourth ones of the mobile communication bodies, the fourth one of the communication bodies by determining that the fourth one of the mobile communication bodies has a lowest possibility, between the third and fourth ones of the mobile communication bodies, that the data communication is detected by the third party, on a basis of the positional information of each of the third and fourth ones of the communication bodies, the terrain information, and the positional information of the third party; and
 transmitting, from the fourth communication body upon the selection, the transmission data to the second communication body.

11. The data communication method of claim 10, wherein each of the mobile communication bodies comprises an aircraft.

12. A non-transitory computer readable storage medium having a data communication program, the data communication program causing, when executed by a computer, the computer to implement a method that performs, in a data communication system that includes a plurality of mobile communication bodies, data communication between the plurality of mobile communication bodies, the method comprising:
 acquiring, with each of the mobile communication bodies, positional information of a third party, positional information of each of the communication bodies, and terrain information, the third party being capable of detecting the data communication performed between the plurality of communication bodies, the terrain information being information on terrain on periphery of a current location of the plurality of mobile communication bodies;
 selecting, when a transmission of transmission data from a first one of the communication bodies to a second one of the communication bodies is not successful and a transmission of the transmission data from the first one of the mobile communication bodies to third and fourth ones of the mobile communication bodies is successful, by the third and fourth ones of the mobile communication bodies, the fourth one of the communication bodies by determining that the fourth one of the mobile communication bodies has a lowest possibility, between the third and fourth ones of the mobile communication bodies, that the data communication is detected by the third party, on a basis of the positional information of each of the third and fourth ones of the communication bodies, the terrain information, and the positional information of the third party; and
 transmitting, from the fourth communication body upon the selection, the transmission data to the second communication body.

13. The non-transitory computer readable storage medium of claim 12, wherein each of the mobile communication bodies comprises an aircraft.

14. A data communication system that includes a plurality of mobile communication bodies, the plurality of mobile communication bodies each comprising circuitry configured to:
 perform data communication between the plurality of mobile communication bodies,
 acquire positional information of a third party, positional information of each of the mobile communication bodies, and terrain information, the third party being capable of detecting the data communication performed between the plurality of mobile communication bodies, the terrain information being information on terrain on a periphery of a current location of the plurality of mobile communication bodies, and
 when a transmission of transmission data from a first one of the mobile communication bodies to a second one of the mobile communication bodies is not successful and a transmission of the transmission data from the first one of the mobile communication bodies to third and fourth ones of the mobile communication bodies is successful, select, with the third and fourth ones of the mobile communication bodies, the fourth one of the mobile communication bodies based on a determination that the fourth one of the mobile communication bodies is lowest among the third and fourth ones of the mobile communication bodies in a possibility that the data communication is detected by the third party, on a basis of the positional information of each of the third and fourth ones of the mobile communication bodies, the terrain information, and the positional information of the third party, and
 wherein, upon selection, the fourth one of the mobile communication bodies is configured to transmit the transmission data to the second one of the mobile communication bodies.

15. The data communication system of claim 14, wherein each of the mobile communication bodies comprises an aircraft.

* * * * *